United States Patent
Brookes

[15] 3,685,727
[45] Aug. 22, 1972

[54] CALCULATING DEVICE

[72] Inventor: Kenneth Joseph Alban Brookes, East Barnet, England

[73] Assignee: The International Nickel Company, Inc., New York, N.Y.

[22] Filed: Oct. 20, 1970

[21] Appl. No.: 82,401

[30]    Foreign Application Priority Data

Oct. 15, 1969    Great Britain..........53,578/69

[52] U.S. Cl....................235/70 R, 35/31 A, 235/88
[51] Int. Cl. .......................G06g 1/02, G06c 3/00
[58] Field of Search........235/70 R, 70 A, 78, 84, 88; 35/74, 31 A, 31 E

[56]    References Cited

UNITED STATES PATENTS

| 3,282,500 | 11/1966 | Pikus | 235/70 A |
| 3,432,942 | 3/1969 | Jack | 35/31 A |
| 3,544,768 | 12/1970 | Warner | 235/88 |

FOREIGN PATENTS OR APPLICATIONS

| 530,527 | 12/1940 | Great Britain | 235/88 |
| 1,029,281 | 5/1966 | Great Britain | 235/88 |

Primary Examiner—Richard B. Wilkins
Assistant Examiner—Stanley A. Wal
Attorney—Maurice L. Pinel

[57]    ABSTRACT

A calculating device, e.g., a slide rule, with cooperating logarithmic scales on which many constants are identified and readily located for employment in operations such as unit conversions, for example, from the English system to the metric system. A pair of special indices, one member thereof on each of the cooperating scales, is provided for each constant and one member of the pair is located arbitrarily on its scale. The arbitrarily located special indices may be conveniently arranged in groups, each group appropriate to a particular class of conversions, i.e., area, volume, etc.

7 Claims, 4 Drawing Figures

INVENTOR.
KENNETH JOSEPH ALBAN BROOKES
BY
M. L. Pinel
ATTORNEY

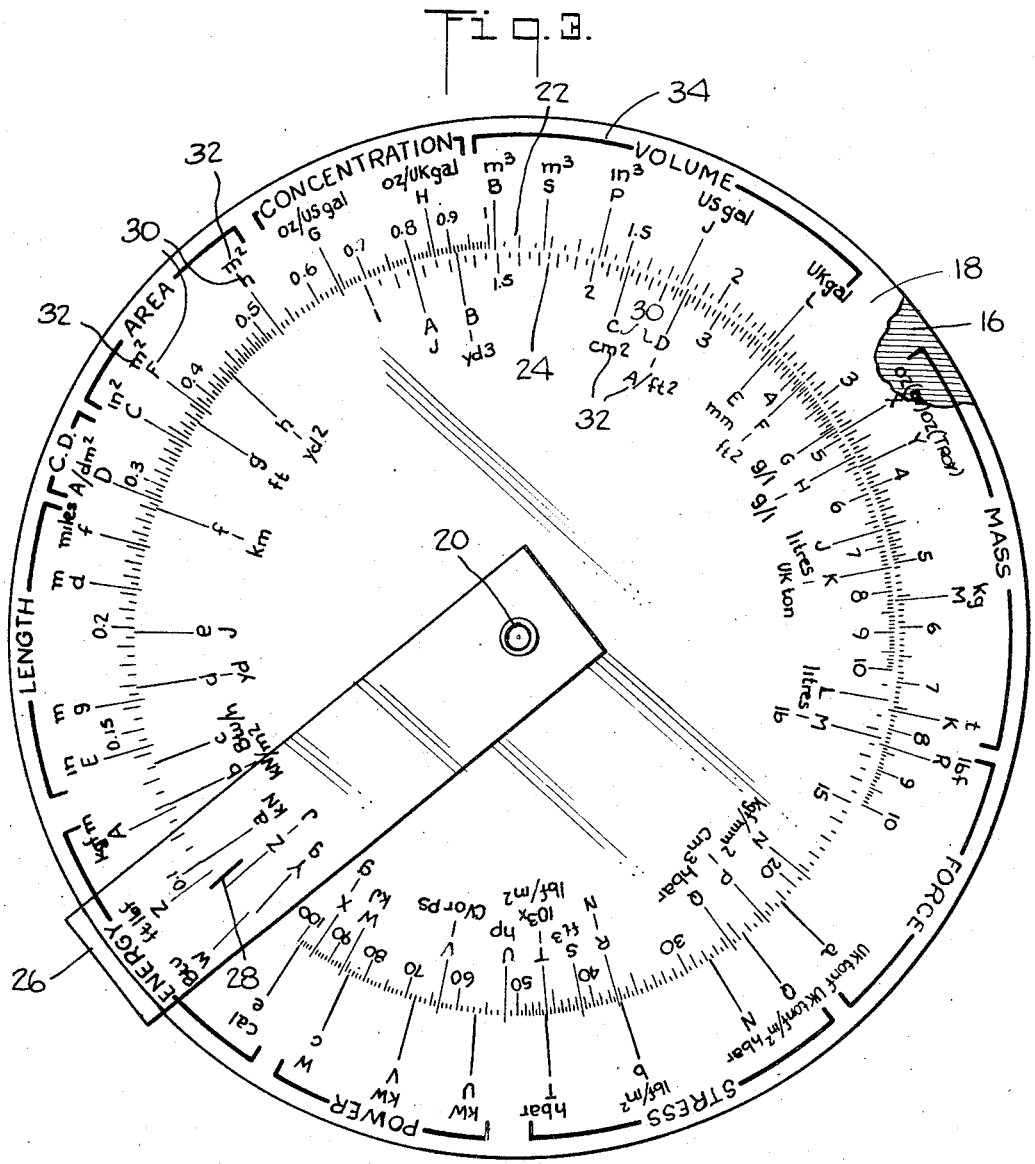

CALCULATING DEVICE

This invention relates to calculating devices, particularly slide rules specially adapted for operations requiring the location and utilization of a plurality of constants, for example, in performing unit conversions.

Sliding cooperating logarithmic scales are very well known for performing simple multiplication and division, for raising numbers to powers and extracting roots. The scales may be straight and parallel, circular, or spiral. A problem arises in the lay-out of sliding logarithmic scales which are required to be used to solve a number of equations in which different constants enter, and which constants are not simple integers or are so close to one another in their numerical value that their separate identity on the scales is difficult to accurately distinguish with the eye. This problem is exemplified in short logarithmic scales designed to allow the conversion of physical quantities from one system into another. One known solution is to provide a sliding circular scale for each unit to be converted and for these scales to be read against a single stationary circular scale. These scales are difficult to use since the individual scales cannot all be placed in direct register with the scale against which they are to be read.

It has now been found, surprisingly, that one sliding and one stationary logarithmic scale can be set with great accuracy and used to solve many separate equations each having different constants of complex and often close numerical values.

It is an object of this invention to provide a slide rule on which numerous constants are provided which are conveniently located and may be readily identified and utilized.

It is another object of this invention to provide a circular slide rule on which many operations involving predetermined constants may readily be performed.

Other objects and advantages will become apparent from the following description taken in conjunction with the accompanying drawings in which:

FIG. 3 is a plan view of a circular slide rule made in accordance with this invention.

Generally speaking, the present invention contemplates a slide rule having a plurality of constants identified thereon and comprising a sliding logarithmic scale element adapted to cooperate with a stationary logarithmic scale element, the scales of the slide rule each having thereon one of a pair of special index marks associated with each constant identified. One of the said special index marks of each pair is arbitrarily located on its scale thereby fixing the position on the other scale of the mating special index mark, since when the pair of special index marks is brought into coincidence an index of the slide rule is set to a given numerical constant. Each of the special index marks is identified by a symbol associated with a particular constant. The symbols which are employed should preferably have no arithmetical significance and the symbols applicable to a particular constant may be identical. Conveniently, they may be the letters of the alphabet. These letter symbols are directly associated with the appropriate constants by means of a printed table. In the case of constants employed for unit conversions, the printed table relates the letter symbol to the unit conversion as well as to the numerical value of the constant.

Figure 1A:
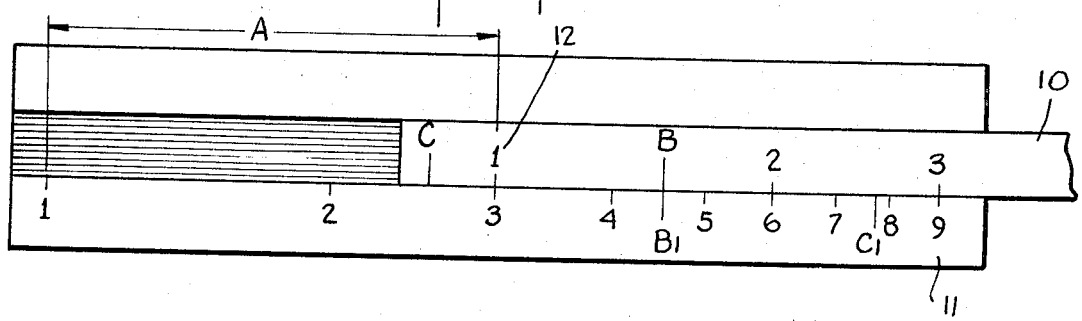
FIG. 1A is a plan view of an illustrative slide rule with one sliding and one stationary scale illustrating certain aspects of the invention.

Referring now to FIG. 1A, there is illustrated a simple sliding logarithmic scale 10 to be read against a fixed logarithmic scale 11. In the setting shown, the scales are placed for the solution of the simple equation $y = Ax$ where $A$ is a constant. The index 12 of the sliding scale is placed over the constant A on the fixed scale. In the illustration $A = 3$ and each scale mark on the sliding scale 10 stands over the value of itself multiplied by the constant A on scale 11.

Figure 1B:
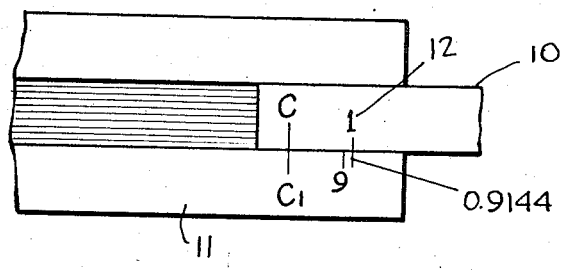
FIG. 1B is a view of a slide rule similar to that of FIG. 1A, illustrating certain advantages of the invention.
Figure 2:
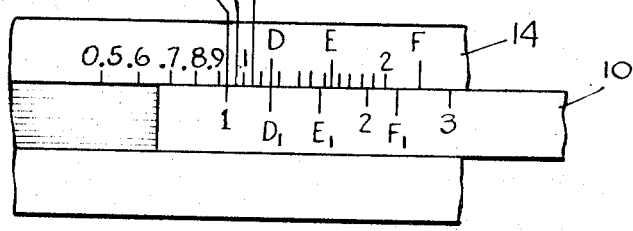
FIG. 2 is a plan view of a slide rule similar to that of FIGS. 1A and 1B illustrating certain problems of prior art methods for indicating constants on slide rules.

The same result however is achieved according to the invention by the use of the special index marks $BB_1$ being brought, as shown in FIG. 1A, into coincidence. Either the mark B or the mark $B_1$ is selected arbitrarily in its position on the scales, that is to say, arbitrarily in the arithmetical sense. It will be appreciated that once one special index mark is positioned, the other is fixed by the setting of the scales. If the position of the special index mark B is arbitrarily selected, then special index mark $B_1$ is automatically positioned such that the scale reading $B_1/B$ is equal to the constant A. For example, referring to the showing in FIG. 1B, to convert by means of the same scales yards to meters, the constant is 0.9144. The conventional setting of the scale marks for this conversion is difficult for the eye to accurately locate on a short logarithmic scale, but by the use of two symbols $CC_1$, chosen in the manner described above, it may be achieved with ease, provided the operator is made aware that $CC_1$ are associated with the conversion of yards to meters. The advantage to be obtained by locating special or conversion indices in accordance with the invention is most clearly evident when consideration is given to conversions by means of the same scales; yards to meters, kilograms force per millimeter squared to hectobars and British Thermal Units to kilojoules. The constant in the first case is 0.9144, in the second 0.980665, and in the third 1.05506. As is illustrated in FIG. 2, the conventional setting of the scales 10 and 14 for these conversions is not easy to achieve if they are provided with true index marks since the marks would be extremely close together and confusing to the eye, especially on a scale of short length.

In the system according to the invention, however, the same end result is achieved with facility by the use of three sets of special or conversion index marks, $D_1D$, $E_1E$ and $F_1F$ which may be brought, as required, into coincidence (FIG. 2), the operator being made aware that $D_1D$, $E_1E$ and $F_1F$ are associated, respectively, with the desired conversions. The locations of the conversion index marks $D_1$, $E_1$ and $F_1$ on scale 10 are chosen arbitrarily, primary consideration being given to an unambiguous presentation to the eye and a convenient grouping of similar units.

As shown in FIG. 3, two circular logarithmic scales, one fixed and one sliding, have been provided in a device of convenient size. The circular slide rule in FIG. 3 is composed of disk 16 and transparent disk 18 of equal size which are coaxially mounted and rotatable with respect to each other about the grommet 20. Disk 16 is an opaque member on which is printed a logarithmic scale 22 adjacent the periphery thereof. The coaxial transparent disk 18 is mounted in contact with the opaque disk 16 and all indices on the face of the opaque disk are visible through the transparent disk 18. In addition, the transparent disk 18 has imprinted on the surface adjacent the opaque disk a logarithmic scale 24 which is positioned to cooperate with the scale 22 on the opaque disk 16. Since the disks are slidable with respect to each other, the usual kind of slide rule computations can be performed on this device and a transparent cursor 26 provided with a hairline 28 facilitates computation. Each scale of the slide rule actually consists of two successive logarithmic scales each of which occupies no more than 120° (i.e., one third of the circle); this feature makes the decimal point unambiguous in all conversions which can be accommodated on the said rule. The indices provided on the disks include a plurality of letter symbols; for example, the letter symbols 30 (with unit designations 32 adjacent thereto), associated with the conversion index marks representing constants for use in unit conversions.

The table below relates these letter symbols to the unit conversions which can be performed with the slide rule of FIG. 3 as well as to the numerical value of each conversion constant. It is to be understood that the conversions can equally well be made in the reverse direction.

Conversion Constants and Index Symbols

| Unit | Convert | to | Multiply by | Symbol |
|---|---|---|---|---|
| Length | in | mm | 25.4 | E |
|  | ft | m | 0.3048 | g |
|  | yd | m | 0.9144 | d |
|  | miles | km | 1.60934 | f |
| Current Density | A/ft$^2$ | A/dm$^2$ | 0.107639 | D |
| Area | in$^2$ | cm$^2$ | 6.4516 | C |
|  | ft$^2$ | m$^2$ | 0.092903 | F |
|  | yd$^2$ | m$^2$ | 0.836127 | h |
| Concentration | oz/US gal | g/l | 7.4891 | G |
|  | oz/UK gal | g/l | 6.2360 | H |
| Volume | yd$^3$ | m$^3$ | 0.764555 | B |
|  | ft$^3$ | m$^3$ | 0.0283168 | S |
|  | in$^3$ | cm$^3$ | 16.3871 | P |
|  | US gal | litres | 3.78541 | J |
|  | UK gal | litres | 4.54609 | L |
| Mass | oz(av) | g | 28.3495 | X |
|  | oz(Troy) | g | 31.1035 | y |
|  | lb | kg | 0.45359237 | M |
|  | UK ton | t | 1.01605 | K |
| Force | lbf | N | 4.44822 | R |
|  | UK tonf | kN | 9.96402 | a |
| Stress | UK tonf/in$^2$ | hbar | 1.54443 | Q |
|  | kgf/mm$^2$ | hbar | 0.980665 | N |
|  | lbf/in$^2$ | kN/m$^2$ | 6.89476 | b |
|  | 10$^3$×lbf/in$^2$ | hbar | 0.689476 | T |
| Power | hp | kW | 0.745700 | U |
|  | CV or PS | kW | 0.735499 | V |
|  | Btu/h | W | 0.293071 | C |
| Energy | cal | J | 4.1868 | e |
|  | Btu | kJ | 1.05506 | W |
|  | ft lbf | J | 1.35582 | Z |
|  | kgf m | J | 9.80665 | A |

The face of the circular rule as seen in FIG. 3 includes conversion index marks provided with the following symbols from the above table: a, b, c, d, e, f, g, h, j, k, A, B, C, D, E, F, G, H, J, K, L, M, N, P, Q, R, S, T, U, V, W, X. In use, identical symbols are brought into coincidence and the symbols are associated with the units and their constants of conversion by reference to the table which may be printed on the reverse of the opaque disk 16. In addition, the units are printed adjacent each letter symbol on the slide rule scales so that unit conversions may be accomplished without reference to the table.

A total of 32 unit conversions are thus provided for in a device which is less than 6 inches in diameter, yet provides a relatively uncluttered presentation of the necessary indices. Further, conversions of a particular class are conveniently grouped together under an appropriate legend in a particular section or field of one scale; for example, length, current density, area, concentration, volume, mass, force, power and energy. It will be noted, as an example, that all volume conversions on scale 22 are located in volume field 34.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A calculating device of the slide rule type incorporating indices to facilitate the location and utilization of predetermined constants for unit conversions or other mathematical operations, the device having a pair of cooperating logarithmic scale elements capable of sliding with respect to each other, the indices comprising a first set of special index marks each of which is arbitrarily but conveniently located on one of said scale elements, each of said special index marks being identified by a symbol associated with a particular constant, a second set of special index marks located on the other of said scale elements and identified by symbols associated with the above-mentioned constants, each of said second set of special index marks being so positioned that when the special index marks associated with a particular constant on each scale are juxtaposed, an index of the slide rule is set at the numerical value of the constant on the other of said scales.

2. The calculating device of claim 1 wherein the cooperating scale elements are circular and are coaxially mounted.

3. The calculating device of claim 2 adapted to carry out unit conversions wherein a unit identification legend is provided on the scale elements adjacent each symbol.

4. The slide rule of claim 3 wherein the arbitrarily located special index marks are grouped by class of conversions.

5. The slide rule of claim 4 wherein each of the said cooperating scale elements includes thereon two or more successive logarithmic scales.

6. A circular slide rule adapted to facilitate unit conversions comprising two disks which are coaxially mounted and slidable with respect to each other, the first of said disks having near its periphery a logarithmic scale with indices dividing the scale into fields wherein identified classes of conversions are performed, there being at least one arbitrarily located conversion index mark on the scale within each of said fields, the said conversion index marks each being identified by a symbol and a unit legend, the second of said disks having a logarithmic scale thereon adjacent to and in cooperative relation with the scale on the first disk, conversion index marks on the second disk corresponding respectively to each of the conversion index marks on the first disk, each conversion index mark on the second disk being identified by the same symbol as the corresponding conversion index mark on the first disk and a unit legend which when taken with the unit legend on the corresponding conversion index mark indicates the conversion which can be performed by each pair of conversion index marks, the location of each conversion index mark on the second disk being such that when corresponding conversion index marks on the cooperating scales are brought into coincidence, an index of one slide rule scale is set at the conversion factor on the other of said scales.

7. The circular slide rule of claim 6 wherein the disks are of substantially equal size and the second of said disks is transparent.

* * * * *